United States Patent
Yamaguchi et al.

(10) Patent No.: US 6,755,465 B2
(45) Date of Patent: Jun. 29, 2004

(54) ANTI-SUBMARINE VEHICLE OCCUPANT RESTRAINT SYSTEM

(75) Inventors: Hiroyoshi Yamaguchi, Yokohama (JP); Eiji Shimizu, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 372 days.

(21) Appl. No.: 09/976,334

(22) Filed: Oct. 12, 2001

(65) Prior Publication Data

US 2002/0053793 A1 May 9, 2002

(30) Foreign Application Priority Data

Oct. 13, 2000 (JP) ........................................ 2000-314320

(51) Int. Cl.$^7$ ................................................. B60N 2/42
(52) U.S. Cl. .................................................. 297/216.1
(58) Field of Search ........................ 297/216.1, 216.19, 297/284.11, 216.18; 296/68.1

(56) References Cited

U.S. PATENT DOCUMENTS

| | | | | |
|---|---|---|---|---|
| 5,556,159 A | | 9/1996 | Canteleux | 297/216.1 |
| 5,908,219 A | * | 6/1999 | Bohmler | 297/216.1 |
| 6,050,635 A | | 4/2000 | Pajon et al. | 297/216.1 |
| 6,113,185 A | * | 9/2000 | Yamaguchi et al. | 297/216.1 |
| 6,254,181 B1 | * | 7/2001 | Aufrere et al. | 297/216.1 |
| 6,460,819 B1 | * | 10/2002 | Muhlberger et al. | 297/216.1 |

FOREIGN PATENT DOCUMENTS

EP 0 965 479 A2 12/1999

OTHER PUBLICATIONS

Patent Abstracts of Japan, Publication No. 2000264114, Sep. 26, 2000, 1 page.
Patent Abstracts of Japan, Publication No. 2000272446, Oct. 3, 2000, 1 page.

* cited by examiner

*Primary Examiner*—Anthony D. Barfield
(74) *Attorney, Agent, or Firm*—MacPherson Kwok Chen & Heid LLP

(57) ABSTRACT

In a vehicle occupant restraint system provided in association with a vehicle seat for preventing a vehicle occupant from slipping forward under a seat belt in an impact situation such as a vehicle crash, a pair of casings are provided on either side of the seat frame, and pivotally support a pair of arms across which a cross member extends. A power unit pivotally incorporated in at least one of the casings raises the arms and cross member in an impact situation. The casing is formed by a main member having a vertical section and a pair or flanges extending from upper and lower ends of the vertical section, and a lid member attached to the free ends of the flanges. The hollow structure of the casing provides a high level of mechanical strength, and the two piece structure of the casing allows the assembly work to be performed in a simple manner because the components can be installed from sideways one after another in a relatively simple manner.

17 Claims, 8 Drawing Sheets

ANTI-SUBMARINE VEHICLE OCCUPANT RESTRAINT SYSTEM

TECHNICAL FIELD

The present invention relates to a vehicle occupant restraint system that is provided in a vehicle seat, and in particular to a vehicle occupant restraint system for preventing the submarining or slipping forward of the vehicle occupant under the seat belt in an impact situation such as a vehicle crash.

BACKGROUND OF THE INVENTION

The term "submarining" means the slipping forward of a vehicle occupant under the seat belt in an impact situation such as a vehicle crash in case the lap belt fails to restrain the pelvis of the vehicle occupant. This occurs most frequently when the vehicle occupant is sitting on an edge of the seat and/or the seat back is significantly reclined, and could impair the restraining capability of the seat belt because the seat belt fails to restrain the proper part of the vehicle occupant.

A copending U.S. patent application Ser. No. 09/526,405 filed Mar. 15, 2000 discloses a vehicle occupant restraint system in which a forward slip preventing member is moveably supported by a pair of casings fixedly attached to either side of a seat frame at a front part of a seat bottom so as to selectively project upward. The front end of the seat is raised only in case of an impact situation such a vehicle crash by actuating this forward slip preventing member with a power unit. The contents of this copending application are hereby incorporated in this application by reference.

Because the power unit produces a significant force at the time of its activation, the structural members of the system are required to withstand the resulting reaction force. However, the system is required to be compact enough to be installed in a limited space of a vehicle seat. The system is also desired to be inexpensive for the system to be accepted by the consumers.

BRIEF SUMMARY OF THE INVENTION

In view of such problems of the prior art, a primary object of the present invention is to provide an anti-submarine vehicle occupant restraint system which is compact and light-weight.

A second object of the present invention is to provide an anti-submarine vehicle occupant restraint system which is easy and economical to manufacture.

According to the present invention, such objects can be accomplished by providing a vehicle occupant restraint system provided in association with a vehicle seat for preventing a vehicle occupant from slipping forward under a seat belt in an impact situation such as a vehicle crash, comprising: a pair of fixed support members attached to either side of a seat frame at a front part of a seat bottom; an arm pivotally attached to a front end of each of the fixed support members; a cross member extending between free ends of the arms; and a power unit provided in association with at least one of the support members for actuating the arms and cross member upward so as to selectively raise a front part of the seat bottom in an impact situation such as a vehicle crash; at least one of the support members comprising a main member having a vertically extending section which is elongated in a fore-and-aft direction, an upper flange extending laterally from an upper end of the vertically extending section, and a lower flange extending laterally in a same direction as the upper flange from a lower end of the vertically extending section, and a lid member which is attached to free ends of the upper and lower flanges to form a closed profiled casing in cooperation with the main member.

The hollow structure of the casing provides a high level of mechanical strength, and the two piece structure of the casing allows the assembly work to be performed in a simple manner because the components can be installed from sideways one after another in a relatively simple manner. Likewise, each of the arms may comprise a substantially horizontal web and a pair of arm flanges depending from either side or the web. Preferably, both the casing and arm are formed by stamp forming sheet metal. The pivot shaft for the arm may be passed through the vertically extending section of the main member, the lid member, and the arm flanges. According to a preferred embodiment, the pivot shaft consists of a hollow collar through which one of the mounting bolts for the casing is passed. The other mounting bolt may be passed through a suitable part of the casing. The side flanges of the arm extend along either outer or inner surfaces of the vertically extending section of the main member and the lid member.

Preferably, the power unit comprises a pyrotechnic cylinder unit which is received in the closed profiled casing and extends in the fore-and-aft direction, and a piston rod which is adapted to be actuated by the cylinder unit and engages a point of the corresponding arm offset from a pivot point at which the arm is attached to the casing. The pyrotechnic cylinder unit may be engaged by a pair of shoulders formed in the casing which, for instance, may be defined by edges of openings formed in the casing.

To simplify the arrangement, the lid part of the support member may comprise a part of the seat frame.

For the restraint system to be effective in use, the system may comprise a lock mechanism for retaining a corresponding one of the arms in the upwardly actuated state. It may be provided in each of the casino while the power unit is provided only in one of the casing. The casing typically receives therein a rod which extends in the fore-and-aft direction and engages a point of the corresponding arm offset from a pivot point at which the arm is attached to the support member, and the lock mechanism receives the rod so as to permit a sliding motion of the rod in a direction corresponding to a rising motion of the arm but prevent a sliding motion of the rod in an opposite direction. The rod may extend either rearward or forward from the point of engagement to the arm.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
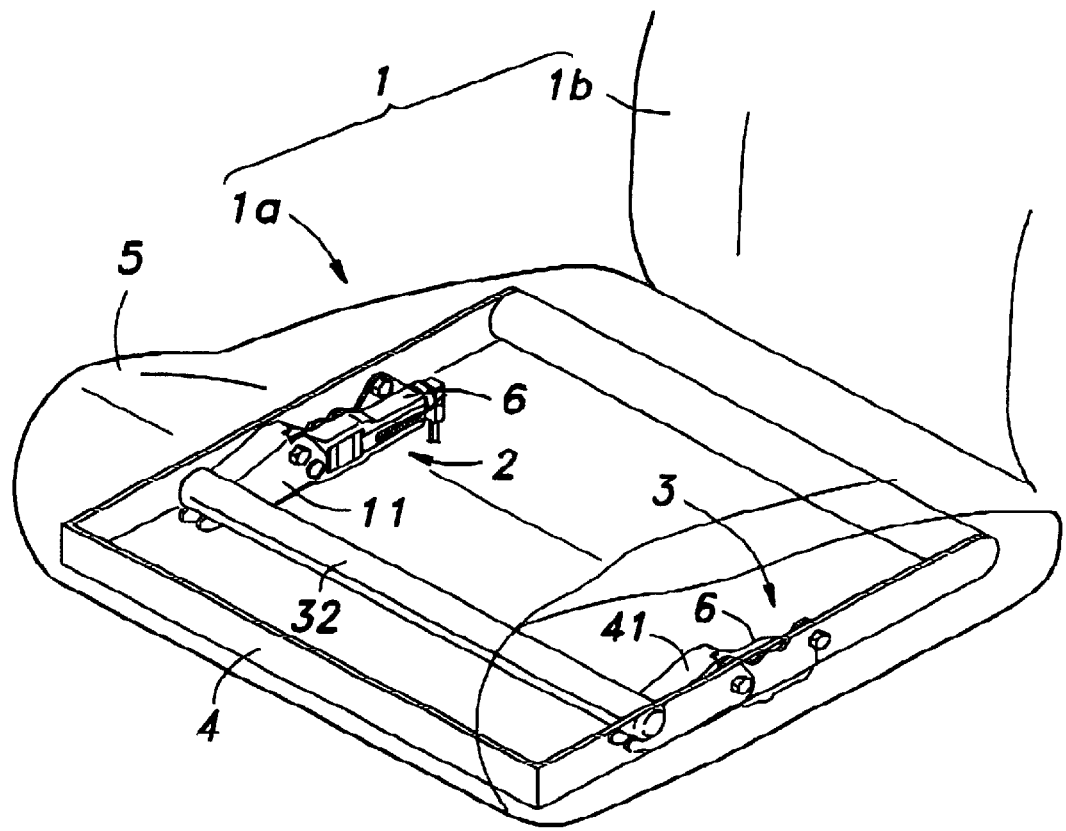
FIG. 1 is a transparent perspective view of a vehicle seat embodying the present invention.

FIG. 1 is a perspective view of a vehicle seat 1 embodying the present invention. The vehicle seat 1 comprises a seat bottom 1a and a seat back 1b which is typically adapted to be reclined to a desired angle by an adjustable pivot mechanism not shown in the drawing. The seat bottom 1a comprises a seat frame 4 which in this case consists of a rectangular frame having a pair of longitudinal side members and a pair of cross members joining the front and rear ends of the side members with each other, and a cushion member 5 which covers the seat frame 4. The cushion member 5 may be simply made of foamed plastic material or consist of any known composite structure. A pair of subassemblies 2 and 3 forming a vehicle occupant restraint system according to the present invention are attached to the inner sides of the side members of the seat frame 4. The seat frame 4 may be supported by a seat rail assembly fixedly attached to the vehicle body via sliders in a slidable manner, and adapted to be fixed at a desired position with a seat adjust mechanism not shown in the drawing.

Figure 2:
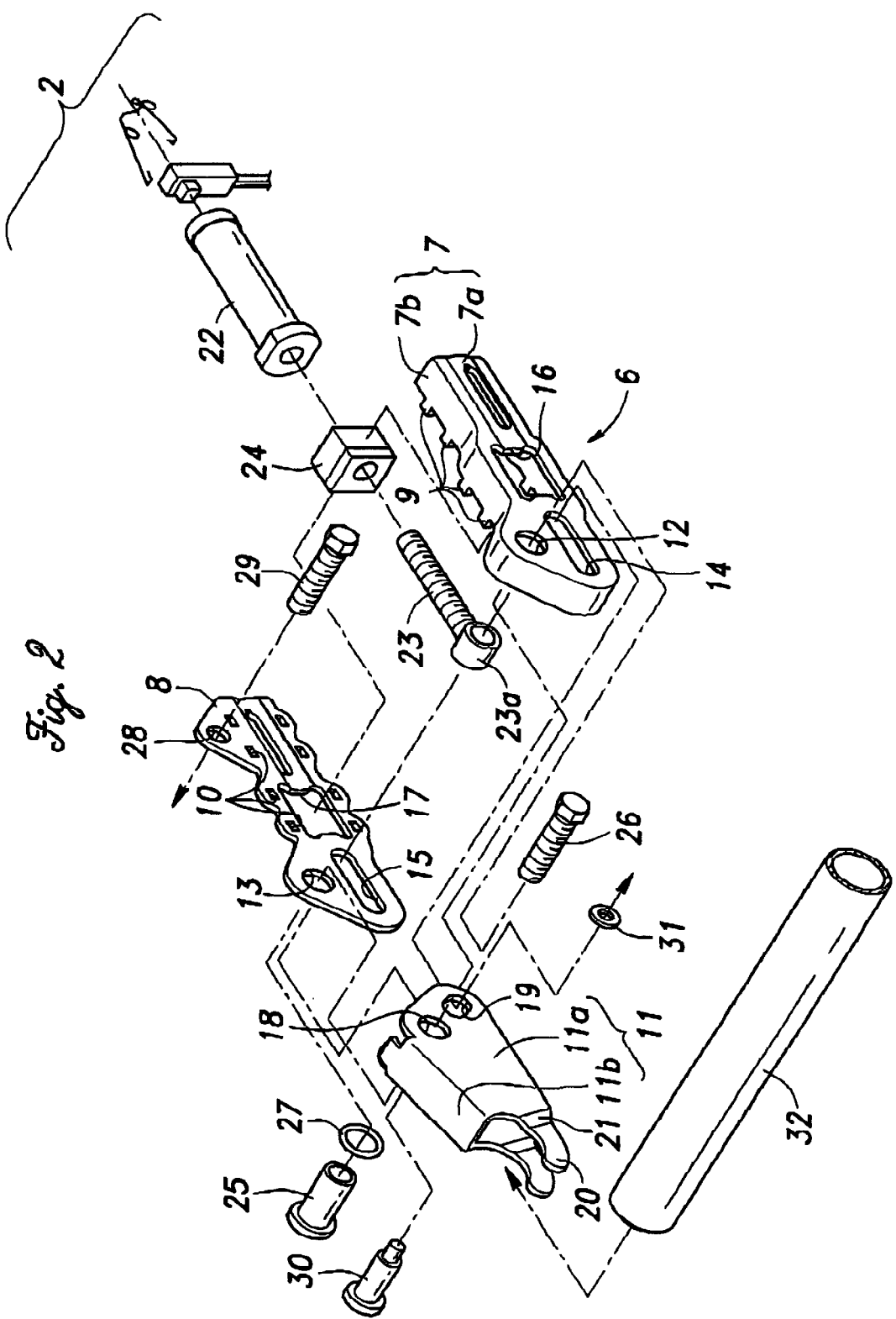
FIG. 2 is an exploded perspective view of the subassembly provided on the right had side of the seat frame.
Figure 3:
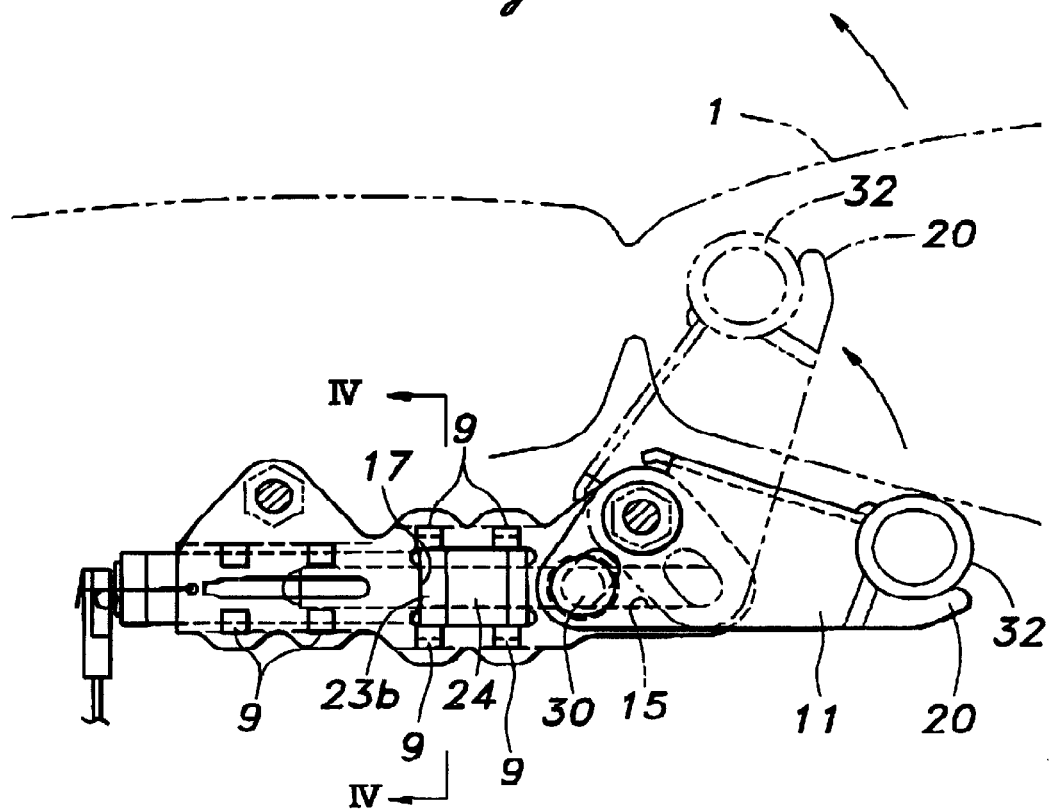
FIG. 3 is a side view of the subassembly on the right as seen from the right side.
Figure 4:
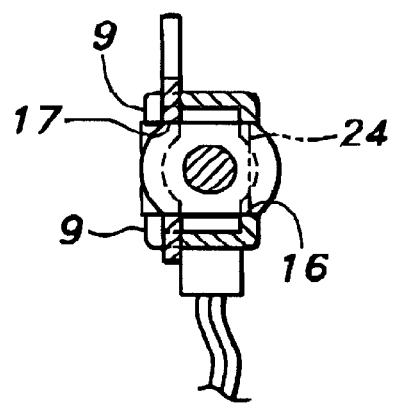
FIG. 4 is a cross sectional view taken along line IV—IV of FIG. 3.

FIGS. 2 to 4 show the structure of the subassembly 2 on the right hand side of the vehicle occupant restraint system. The subassembly 2 comprises a tubular casing 6 having a rectangular cross section and elongated in the fore-and-aft direction of the vehicle body. The casing 6 is comprised of a main member 7 and a lid member 8 both of which are formed by stamp forming sheet metal. The main member 7 comprises a vertically extending section 7a and a pair of flanges 7b extending from upper and lower ends of the vertically extending section 7a toward the lid member 8. In this embodiment the upper and lower flanges 7a are smoothly connected to each other at the front end of the casing 6. Free ends of the upper and lower flanges 7b are provided with projecting tabs 9 which are fitted into corresponding openings 10 provided in the lid member 8, and crimped on the lid member 8.

An arm 11 is pivotally attached to the front end of the casing 6. The arm 11 comprises a laterally extending web 11a and a pair of arm flanges 11b depending from either side of the web 11a The upper front parts of the main member 7 and lid member 8 are provided with mutually aligned openings 12 and 13, and a corresponding opening 19 is passed through the arm flanges 11b. A collar 25 is passed through these openings 12, 13 and 19 to pivotally support the arm 11 with respect to the casing 6.

A power unit comprising a cylinder unit 22 extending in a fore-and-aft direction and a piston rod 23 extending from a front end of the cylinder unit 22 is received in the casing 6. The front end of the piston rod 23 is provided with a ring 23a. The outer circumferential surface of the piston rod 23 is provided with annular or spiral grooves. The lower front parts of the main member 7 and lid member 8 are provided with slots 14 and 15 elongated in the fore-and-aft direction, and a corresponding oblique slot 18 which is only slightly elongated and offset from the opening 19 is passed through the arm flanges 11b. A pin 30 is passed through these slots 14, 18 and 15 and the ring 23a, and is retained therein by a retaining ring 31.

As best shown in FIG. 4, the vertically extending section 7a of the main member 7 and lid member 8 are profiled so as to conform to or wrap around the cylindrical contour of the cylinder unit 22. Rectangular openings 16 and 17 are formed in intermediate parts of the main member 7 and lid member 8, and jointly retain therein a radial flange 22a formed in the front end of the cylinder unit 22 as well as a luck mechanism 24 provided on the front end of the radial flange 22a. Thus, the front facing edges or the rectangular openings 16 and 17 are adapted to support the reaction of the cylinder unit 22 at the time of its activation via the back surface of the radial flange 22a. These edges are also contoured around the cylinder unit 22 as a result of the fact that the vertically extending section 7a of the main member 7 and lid member 8 are contoured around the cylinder unit 22, and are therefore allowed to abut the back surface of the radial flange 22a over a relatively large support surface. These rectangular openings 16 and 17 are each closed on all sides so that a high mechanical strength can be achieved with respect to the impact which is generated at the time of the activation of the vehicle occupant restraint system.

This subassembly 2 is attached to the side member of the seat frame 4 by passing a pair of threaded bolts 26 and 29 through the collar 25 pivotally supporting the arm 11 and a hole 28 formed in a tab-like extension of the lid member 8 at an upper rear end thereof from inside the seat frame 4 and fastening nuts from the outside of the seat frame 4. The collar 25 is provided with an adequate length to support the axial force of the threaded bolt 26 without preventing the pivoting movement of the arm 11. Therefore, there is a play that permits a slight lateral movement of the arm 11 along the collar 25, and a rubber ring 27 interposed between a head of the collar 25 and a side of the arm 11 prevents any rattling of the arm 11 during use.

Figure 5:
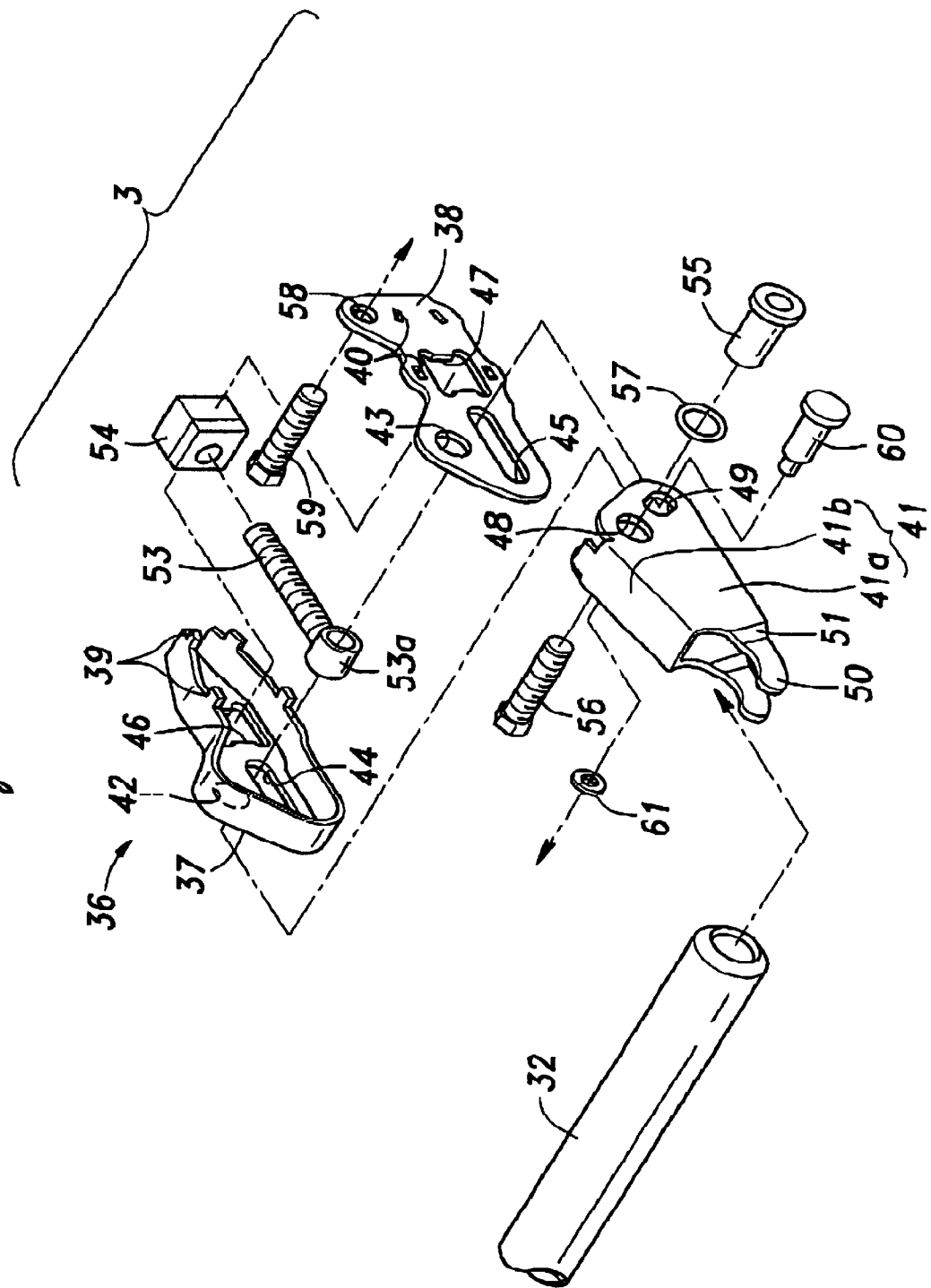
FIG. 5 is a perspective view of the subassembly provided on the left had side of the seat frame.
Figure 6:
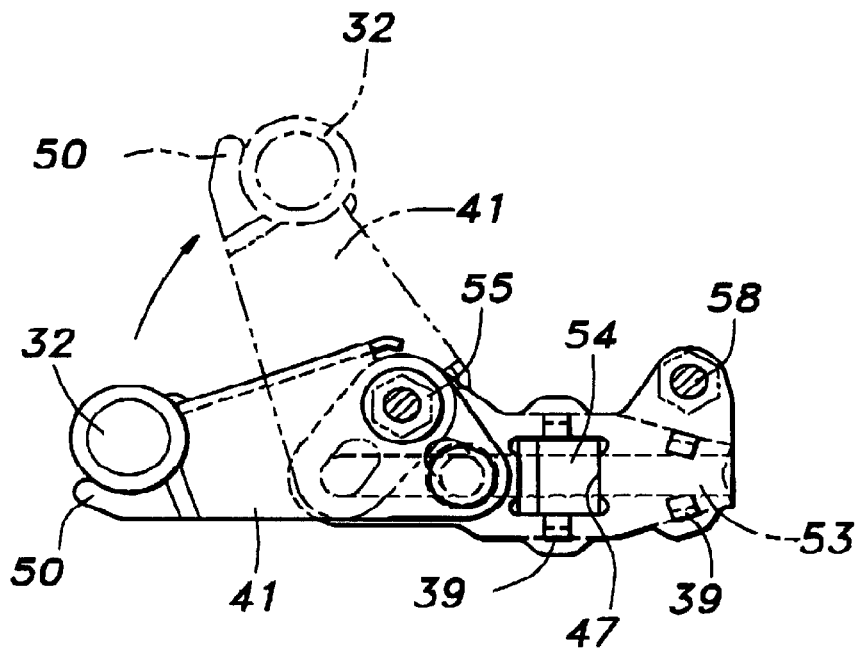
FIG. 6 is a side view of the subassembly on the left as seen from the left side.

FIGS. 5 and 6 show the structure of the subassembly 3 on the left hand side of the vehicle occupant restraint system. The subassembly 3 comprises a tubular casing 36 having a rectangular cross section and elongated in the fore-and-aft direction of the vehicle body. The casing 36 is comprised of a main member 37 and a lid member 38 both of which are formed by stamp forming sheet metal. The main member 37 comprises a vertically extending section 37a and a pair of flanges 37b extending from upper and lower ends of the vertically extending section 37a toward the lid member 38. Free ends of the upper and lower flanges 37b are provided with projecting tabs 39 which are fitted into corresponding openings 40 provided in the lid member 38, and crimped on the lid member 38.

An arm 41 is pivotally attached to the front end of the casing 36. The arm 41 comprises a laterally extending web 41a and a pair of arm flanges 41b depending from either side of the web 41a. The upper front parts of the main member 37 and lid member 38 are provided with mutually aligned openings 42 and 43, and a corresponding opening 49 is passed through the arm flanges 41b. A collar 55 is passed through these openings 42, 43 and 49 to pivotally support the arm 41 with respect to the casing 36.

A rod 53 extending in a fore-and-aft direction is received in the casing 36. The front end of the rod 53 is provided with a ring 53a. The outer circumferential surface of the rod 53 is provided with annular or spiral grooves. The lower front parts of the main member 37 and lid member 38 are provided with slots 44 and 45 elongated in the fore-and-aft direction, and a corresponding oblique slot 48 which is only slightly elongated and offset from the opening 49 is passed through the arm flanges 41b. A pin 60 is passed through these slots 44, 48 and 45 and the ring 53a, and is retained therein by a retaining ring 61.

Rectangular openings 46 and 47 am formed in intermediate parts of the main member 37 and lid member 38, and jointly retain therein a lock mechanism 54 and the rod 53 is passed through this lock mechanism 54.

This subassembly 3 is attached to the side member of the seat frame 4 by passing a pair of threaded bolts 56 and 59 through the collar 55 pivotally supporting the arm 41 and a hole 58 formed in a tab-like extension of the lid member 38 at an upper rear end thereof from inside the seat frame 4 and fastening nuts from the outside of the seat frame 4. The collar 55 is provided with an adequate length to support the axial force of the threaded bolt 56 without preventing the pivoting movement of the arm 41. Therefore, there is a play that permits a slight lateral movement of the arm along the collar, and a rubber ring 57 interposed between a head of the collar 55 and a side of the arm 41 prevents any rattling of the arm 41 during use.

A cross member consisting of a pipe member 32 and serving as a forward slip preventing member extends across the free end 20 of the arm 11 of the subassembly 2 and the free end 50 of the arm 41 of the subassembly 3. Because the pipe member 32 must not extend beyond the side profile of the subassembly 2 or 3, the free end 20 or 50 of each arm 11 or 41 consisting of the arm flanges are made narrower in width by bending the flanges 11b and 41b inwardly about vertical folding lines as indicated by numeral 21 and 51.

Figure 7:
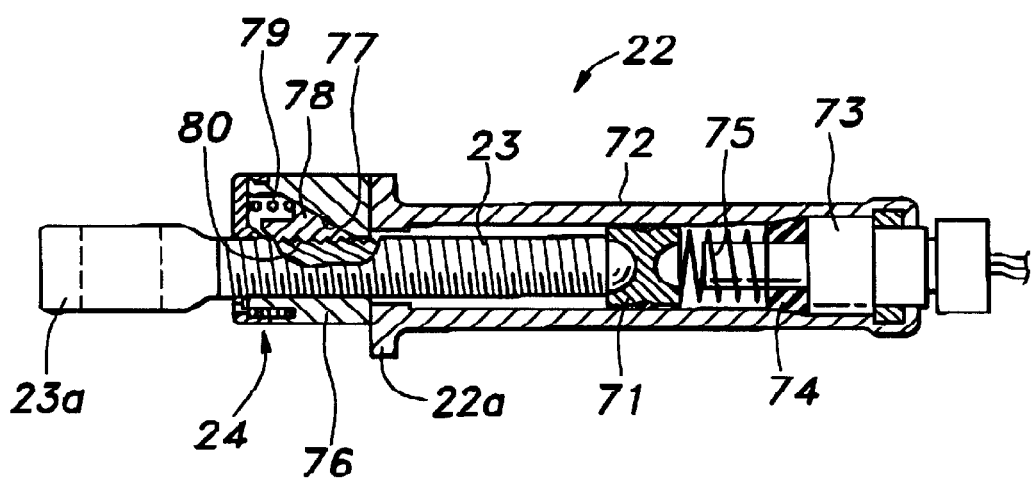
FIG. 7 is a sectional view of the power unit including a cylinder unit and a piston rod.

Referring to FIG. 7, the cylinder unit 22 comprises a cylindrical cylinder member 72, a piston member 71 slidably received in the cylinder member 72 and a propellant module 73 received in an end of the cylinder member 72 remote from the flange 22a. The propellant module 73 is provided with a small diameter portion facing the piston member 71, and an annular seal member 74 is fitted on the small diameter portion so as to abut an annular shoulder defined at the base of the small diameter portion and the inner circumferential surface of the cylinder member 72 to seal off the gas that is produced from the small diameter portion when the propellant module 73 is activated. The end of the cylinder member 72 adjacent to the rear end of the propellant module 73 is crimped on the propellant modulo 73, and the annular seal 74 resiliently supports the propellant module 73 against the force of crimping. A compression coil spring 75 is interposed between the piston member 71 and the annular seal 74. The inner end of the piston rod 23 is provided with a spherical shape, and is received in a complementary spherical recess formed in the piston member 71.

The lock mechanism 24 is provided with a casing 76 which internally defines a sloping surface 77. An engagement piece 78 is resiliently urged against this sloping surface 77 by a compression coil spring 79, and the slopping surface 77 is oriented in such a manner that the engagement piece 78 is resiliently urged also against the outer surface of the piston rod 23 under the spring force of the compression coil spring 79. The engagement piece 78 is provided with teeth 80 which mesh with the grooved surface of the piston rod 23. Because of the orientation of the sloping surface 77, the engagement piece 78 would not prevent the outward movement of the piston rod 23 by being pushed away from the sloping surface 77 against the spring force of the compression coil spring 79, but prevents the inward movement of the piston rod 23 by wedging in between the sloping surface 77 and the outer circumferential surface of the piston rod 23.

Only one engagement piece 78 was used in the above described embodiment to engage a part of the outer circumferential surface of the piston rod 23, but a plurality of engagement pieces may be used for engaging the outer circumferential surface of the piston rod 23 from a plurality of directions. The other lock mechanism 54 may be similar to the lock mechanism 24.

The vehicle occupant restraint systems is thus formed by the right and left subassemblies 2 and 3, and the pipe member 32. An impact detecting sensor consisting of an acceleration sensor or the like not shown in the drawing, and a control unit may be provided for activating the restraint system when appropriate.

The mode of operation of this embodiment is described in the following. When an impact of a vehicle crash is detected, gas is produced in the cylinder unit 22, and the resulting rapid rise in the internal pressure inside the cylinder member 72 produces a thrust which pushes the piston member 71 out of the cylinder member 72 causing the free end of the piston rod 23 to project rapidly. As a result, the arm 11 connected to the free end of the piston rod 23 rotates in counterclockwise direction as indicated by the imaginary lines in FIG. 3, and the pipe member 32 moves upward causing the seat cushion member 5 to bulge out and prevent the submarining of the vehicle occupant. The annular shoulder formed in the inner circumferential surface of the cylinder member 72 at the flanged end of the cylinder unit 22 prevents the piston member 71 from being thrown forward out of the cylinder unit 22. When the gas has ceased to be produced from the propellant module 73, and the drive force of the cylinder unit 22 has been lost, the one-way lock mechanisms 24 and 54 prevent the pipe member 32 from coming down, and continues to prevent the submarining.

The cylinder unit 22 was provided only on the right hand side of the seat, but may also be provided on each side of the seat. If two cylinder units are used, each of them can be made smaller. Although not shown in the drawings, the one-way lock mechanism may also consist of a ball type one-way lock mechanism which can prevent the reverse rotation in a continuous manner, a ratchet mechanism or the like.

Figure 8:
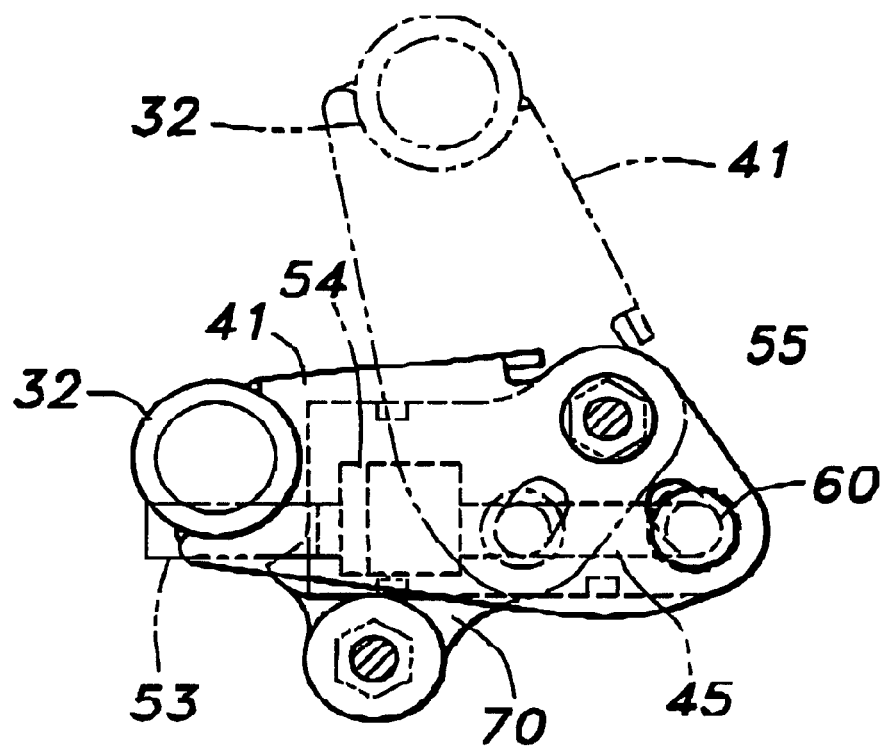
FIG. 8 is a side view an alternate embodiment.

FIG. 8 shows a modified embodiment of the subassembly 3 which is not provided with a power unit. The parts corresponding to those of the previous embodiments are denoted with like numerals. According to this structure, the casing 70 has a smaller length than the corresponding wing of the previous embodiment. A lock mechanism 54 which is substantially identical to the lock mechanism 54 of the previous embodiment is received in the casing 70, and is fixedly secured therein by means which is not shown in the drawing. A rod 53 passes through the lock mechanism 54. The rear end of the rod 53 is provided with a ring 53a through which a pin 60 is passed. The pin 60 is also passed through the flanges of the arm 41 and is guided by slots provided in the arm and the casing in a similar manner as in the previous embodiment. The mode of operation of this embodiment is similar to that of the previous embodiment. This embodiment allows the structure to be highly compact and light weight.

This embodiment can be also applied to the subassembly incorporated with a power unit. In this case, the piston rod is provided with a ring for passing a pin in an intermediate part of the rod, and the rear end thereof is received in the cylinder unit while the front end is received in the lock mechanism.

Figure 9:
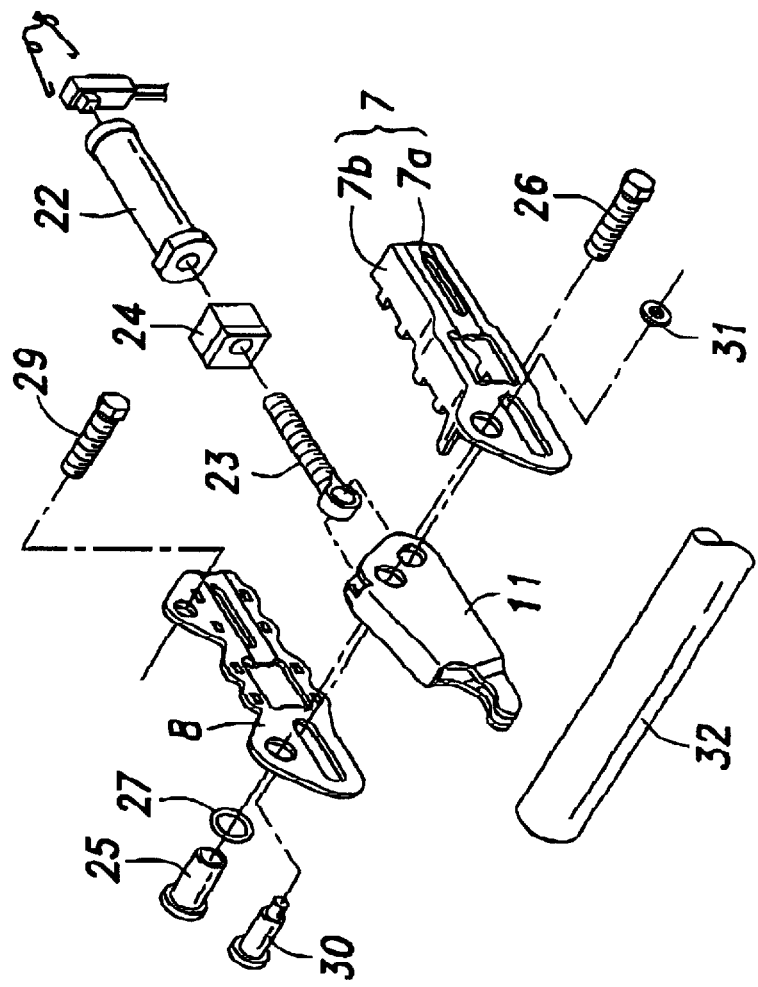
FIG. 9 is a view similar to FIG. 2 showing another embodiment of the preset invention.
Figure 10:
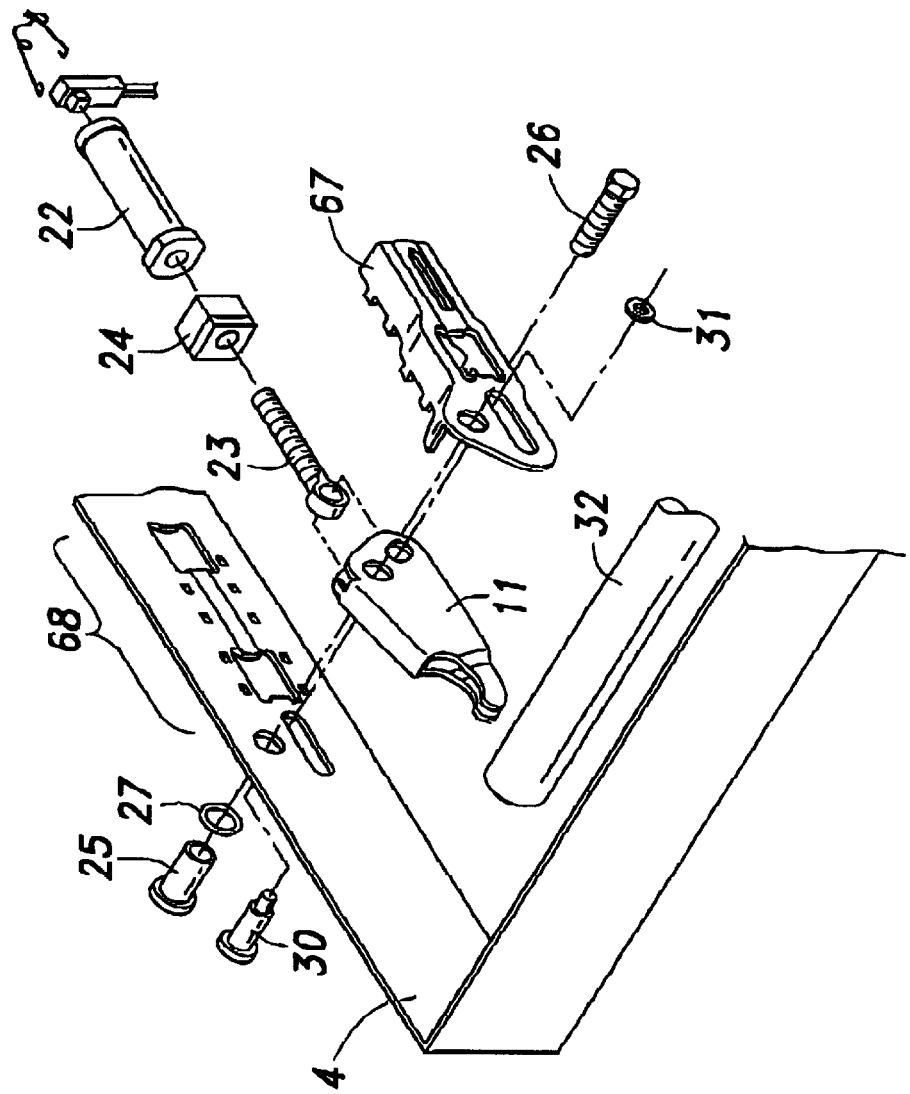
FIG. 10 is a view similar to FIG. 2 showing yet another embodiment of the present invention.

FIG. 9 is a view similar to FIG. 2 showing another embodiment of the subassembly which is provided with a power unit. The parts corresponding to those of the previous embodiments are denoted with like numerals. In this embodiment, the arm 11 has a relatively small width, and is interposed between the vertical section 7a of the main member 7 and the lid member 8. This can be applied equally to the subassembly which is not provided with a power unit. This embodiment allows the overall lateral width of the subassembly to be reduced FIG. 10 is a view similar to FIG. 2 showing yet another embodiment of the subassembly which is provided with a power unit. The parts corresponding to those of the previous embodiments are denoted with like numerals. In this embodiment, the lid member 68 of the casing 66 consists of a part of the seat frame 4. The main member 67 or the casing 60 is similar to that of the previous embodiment. According to this embodiment, the number of component parts is reduced, and the weight of the device is reduced. Similarly as the previous embodiment, the arm 11 is interposed between the vertical section of the main member 67 and the lid member 68, instead of being arranged on the exterior of the casing 66. This can be applied to the subassembly which is not provided with a power unit. This embodiment allows tho overall lateral width of the subassembly to be reduced.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant restraint system provided in association with a vehicle seat for preventing a vehicle occupant from slipping forward under a seat belt in an impact situation such as a vehicle crash, comprising;
    a pair of fixed support members attached to either side of a seat frame at a front part of a seat bottom;
    an arm pivotally attached to a front end of each of said fixed support members;
    a cross member extending between free ends of said arms; and
    a power unit provided in association with at least one of said support members for actuating said arms and cross member upward so as to selectively raise a front part of said seat bottom in an impact situation such as a vehicle crash;
    at least one of said support members comprising a main member having a vertically extending section which is elongated in a fore-and-aft direction, an upper flange extending laterally from an upper end of said vertically extending section, and a lower flange extending laterally in a same direction as said upper flange from a lower end of said vertically extending section, and a lid member which is attached to free ends of said upper and lower flanges to form a closed profiled casing in cooperation with said main member.

2. A vehicle occupant restraint system according to claim 1, wherein said main member consists of stamp formed sheet metal.

3. A vehicle occupant restraint system according to claim 1, wherein each of said arms comprises a substantially horizontal web and a pair of arm flanges depending from either side of said web.

4. A vehicle occupant restraint system according to claim 3, wherein said arms consist of stamp formed sheet metal.

5. A vehicle occupant restraint system according to claim 3, further comprising a pivot shaft passed through said vertically extending section of said main member, said lid member, and said arm flanges.

6. A vehicle occupant restraint system according to claim 3, wherein said power unit comprises a pyrotechnic cylinder unit which is received in said closed profiled casing and extends in the fore-and-aft direction, and a piston rod which is adapted to be actuated by said cylinder unit and engages a point of the corresponding arm offset from a pivot point at which said arm is attached to said casing.

7. A vehicle occupant restraint system according to claim 6, wherein said pyrotechnic cylinder unit is engaged by a pair of shoulders formed in said casing.

8. A vehicle occupant restraint system according to claim 7, wherein said cylinder unit is provided with a cylinder flange at a front end thereof and a cylindrical part extending behind said cylinder flange, said shoulders conforming to a cylindrical profile of said cylindrical part, and engaging said cylinder flange.

9. A vehicle occupant restraint system according to claim 7, wherein said shoulders are defined by openings formed in said casing and adapted to support a cylinder flange provided in a front part of said cylinder unit.

10. A vehicle occupant restraint system according to claim 9, wherein said openings are formed in said vertically extending section of said main member and said lid member.

11. A vehicle occupant restraint system according to claim 5, wherein said side flanges of said arm extend along outer surfaces of said vertically extending section of said main member and said lid member.

12. A vehicle occupant restraint system according to claim 5, wherein said side flanges of said arm extend along inner surfaces of said vertically extending section of said main member and said lid member.

13. A vehicle occupant restraint system according to claim 1, wherein said lid member of said casing comprises a part of said seat frame.

14. A vehicle occupant restraint system according to claim 1, further comprising a lock mechanism for retaining a corresponding one of said arms in said upwardly actuated state which is provided in each of said casings, said power unit being provided only in one of said casings.

15. A vehicle occupant restraint system according to claim 1, further comprising a rod which extends in the fore-and-aft direction and engages a point of the corresponding arm offset from a pivot point at which said arm is attached to said casing, and a lock mechanism which is provided in said casing and receives said rod so as to permit a sliding motion of said rod in a direction corresponding to a rising motion of said arm but prevent a sliding motion of said rod in an opposite direction.

16. A vehicle occupant restraint system according to claim 15, wherein said rod extends rearward from said point of engagement to said arm.

17. A vehicle occupant restraint system according to claim 15, wherein said rod extends forward from said point of engagement to said arm.

* * * * *